US012600175B2

(12) United States Patent
  Tirone et al.

(10) Patent No.: US 12,600,175 B2
(45) Date of Patent: Apr. 14, 2026

(54) TIRE TREAD WITH THREE SIPE LEVELS AND TIRE

(71) Applicant: Bridgestone Europe NV/SA [BE/BE], Zaventem (BE)

(72) Inventors: Antonio Tirone, Rome (IT); Guido Piscopo, Rome (IT); Giuseppe Delli Castelli, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 58 days.

(21) Appl. No.: 18/013,473

(22) PCT Filed: Jul. 28, 2021

(86) PCT No.: PCT/IB2021/056854
  § 371 (c)(1),
  (2) Date: Dec. 28, 2022

(87) PCT Pub. No.: WO2022/023993
  PCT Pub. Date: Feb. 3, 2022

(65) Prior Publication Data
  US 2023/0302854 A1    Sep. 28, 2023

(30) Foreign Application Priority Data
  Jul. 31, 2020    (IT) ........................ 102020000018736

(51) Int. Cl.
  *B60C 11/12*    (2006.01)

(52) U.S. Cl.
  CPC ...... *B60C 11/1218* (2013.01); *B60C 11/1259* (2013.01)

(58) Field of Classification Search
  CPC .. B60C 11/1218; B60C 11/1281; B60C 11/12
  See application file for complete search history.

(56) References Cited

U.S. PATENT DOCUMENTS

| 2002/0017349 A1 | 2/2002 | Lopez | |
| 2017/0008349 A1* | 1/2017 | Tanaka | B60C 11/047 |
| 2019/0100059 A1* | 4/2019 | Kaji | B60C 11/1218 |

FOREIGN PATENT DOCUMENTS

| DE | 102018217712 A1 | 4/2020 | |
| EP | 2138330 A1 | 12/2009 | |
| JP | 2000094908 A | 4/2000 | |
| JP | 2005104194 A * | 4/2005 | B60C 11/1218 |

OTHER PUBLICATIONS

JP 2005-104194 Machine Translation, Hashimoto, Yoshimasa (Year: 2005).*
International Search Authority: International Search Report for corresponding International application No. PCT/IB2021/06854 dated Jan. 10, 2022.

* cited by examiner

*Primary Examiner* — Justin R Fischer
*Assistant Examiner* — Nicholas J Weiler
(74) *Attorney, Agent, or Firm* — Patterson Intellectual Property Law, PC

(57)    ABSTRACT
The present invention relates to a tread for tires. In particular, it refers to a tread that has a sipe geometry with 3 levels.

18 Claims, 2 Drawing Sheets

TIRE TREAD WITH THREE SIPE LEVELS AND TIRE

TECHNICAL FIELD OF THE INVENTION

The present invention relates to a tread for tires. In particular, it relates to a tread that incorporates a sipe geometry with 3 levels that makes it possible to maintain and improve the performance of a tire on dry, wet and/or snow-covered surfaces, also when the tread is worn.

BACKGROUND

Tires are generally fitted with a tread that has grooves extending laterally and/or circumferentially, thereby defin-ing "tread elements" that engage with the ground and that contribute to the overall performance of the tire.

In particular, the presence of generally not very large and thin grooves, called "sipes", define voids which make it possible to increase the contact area between the tread and the road surface. Said sipes may be implemented according to different geometries and penetrate more or less deeply into the same tread.

Sipes are typically formed using molds with profiles that are complementary to the required sipe geometry. During a tire production step, said molds are extracted from the tread at the end of the rubber hardening process.

The presence of sipes generally improves the flexibility of the tread elements, without reducing the fastness thereof. A greater number of biting edges and a greater void percentage (due to the presence of the sipe itself) may increase the grip and the traction efficiency of the tire under specific condi-tions. For example, under wet and/or snow-covered surface conditions, they allow the tire to adhere by eliminating the snow and water collected from the road surface (wiping and digging action).

However, the adhesion performance, especially on a wet and/or snow-covered surface, is very sensitive to the sipe geometry, which, during the useful life of the tire, changes due to tread wear. Decreasing the void percentage and the number of biting edges, leads, in fact, to a decrease in adhesion performance, especially on wet and snow-covered surfaces, and at least in terms of braking and traction.

The prior art discloses various solutions in relation to treads with different sipe geometries, anticipating rectilinear, circular or generally curvilinear sipe profiles.

However, the solutions known to date usually improve performance on wet and/or snow-covered ground only when the tire is still new, to the detriment of the rigidity of the tread elements and thus the performance on a dry and/or regular road surface, thereby accelerating the wear thereof. Furthermore, normal tread wear typically results in a rapid reduction in the void percentage, and the closer it is to the end of the useful life thereof, the tire is subjected to a drastic drop in adhesion in the wet/snow.

To counteract this behavior, some known solutions pro-vide for sipes that vary the geometry thereof in relation to the depth of the sipe itself. However, solutions of this type often have complex sipe geometries that require complex molds in order to be produced.

In this context, a further aspect of criticality is indeed associated with the aforementioned mold extraction step, which is all the more difficult the more complex the sipe geometry.

Some solutions anticipate increasing the depth of the sipe in order to facilitate the separation of the opposite faces thereof during the extraction of the mold, to the detriment however of the final stiffness of the tread. In other cases, not particularly deep sipes, or sipes with significantly variable geometries, still require delicate mold extraction operations which often involve micro-damage to the tread elements. The extraction activity requires, in fact, the application of elevated forces that are likely to subject the inner regions of the sipe to excessive stress, deforming them and jeopardiz-ing the overall performance of the tire.

For example, EP2138330 A1 discloses a sipe having opposite faces that are configured to cooperate therebetween and wherein the distance thereof is at a maximum within that region of the tread which is subjected to maximum deflec-tion.

JP2000094908A discloses sipes that are characterized by an overall zigzag conformation such as to prevent deforma-tion of the block and to increase the stiffness thereof. JP2000094908A provides for a sipe wherein the thickness thereof is smaller in a radial end section than in an adjacent section.

DE102018217712A1 proposes a sipe which includes symmetrical recesses that develop along an axial direction within the component of the tread and that are positioned at a continuously variable depth in a radial direction within said component, between the surface thereof that is in contact with the ground and the main grooves.

BRIEF DESCRIPTION OF THE INVENTION

The technical problem posed and solved by the present invention is therefore to overcome the problems described above and, in particular, to provide a tread with a sipe geometry such as to mitigate the void loss and reduction in sipe biting edges as a result of normal wear during the life of the tire.

This is achieved by means of a tire tread as defined in claim 1.

A further object of the present invention is a tire as defined in claim 10.

Further characteristics of the present invention are defined in the corresponding dependent claims.

The tread according to the present invention is such as to ensure adequate performance under wet and/or snow-cov-ered road surface conditions while maintaining the rigidity required in the case of a dry road surface without the wear thereof being accelerated or an uneven pattern of the latter being verified. Furthermore, the conformation of a tread according to the invention makes it possible to facilitate the tire mold extraction process by means of a sipe that is characterized by an optimal profile and depth in view of the aforementioned technical limitations.

For the purposes of the present invention, the term "tread element" refers to a portion of the tread pattern that can be repeated, identical to itself, along the entire length of the tread.

The term "tread component", or simply "component", refers to any block of the tread, regardless of the form and/or positioning thereof.

The term "contact surface" refers to that portion of a surface of a component which comes into contact with the ground during the rolling of the tire.

The term "sipe" refers to a thin and generally narrow groove on a tread component obtained by means of the molding of the tire and particularly intended to improve the performance of the tire on dry, wet and/or snow-covered surfaces.

Other advantages, together with the characteristics and usages of the present invention, will become clear from the following detailed description of the preferred embodiments thereof given purely by way of non-limiting examples.

BRIEF DESCRIPTION OF THE FIGURES

Reference will be made to the drawings in the attached figures, wherein.

The thicknesses and curvatures shown in the above figures should be understood to be purely exemplary and are not necessarily shown in proportion. Furthermore, in these figures some layers/components of the tire may have been omitted for a clearer illustration of the aspects of the present invention.

DETAILED DESCRIPTION OF EMBODIMENTS OF THE INVENTION

The present invention will be described below with reference to the above figures.

For descriptive simplicity reference will be made hereinafter to a generic tread block. As already mentioned, it is however to be understood that the principle underlying the present invention is applicable to any tread component, whether it is a block or something else.

Figures 1, 2:
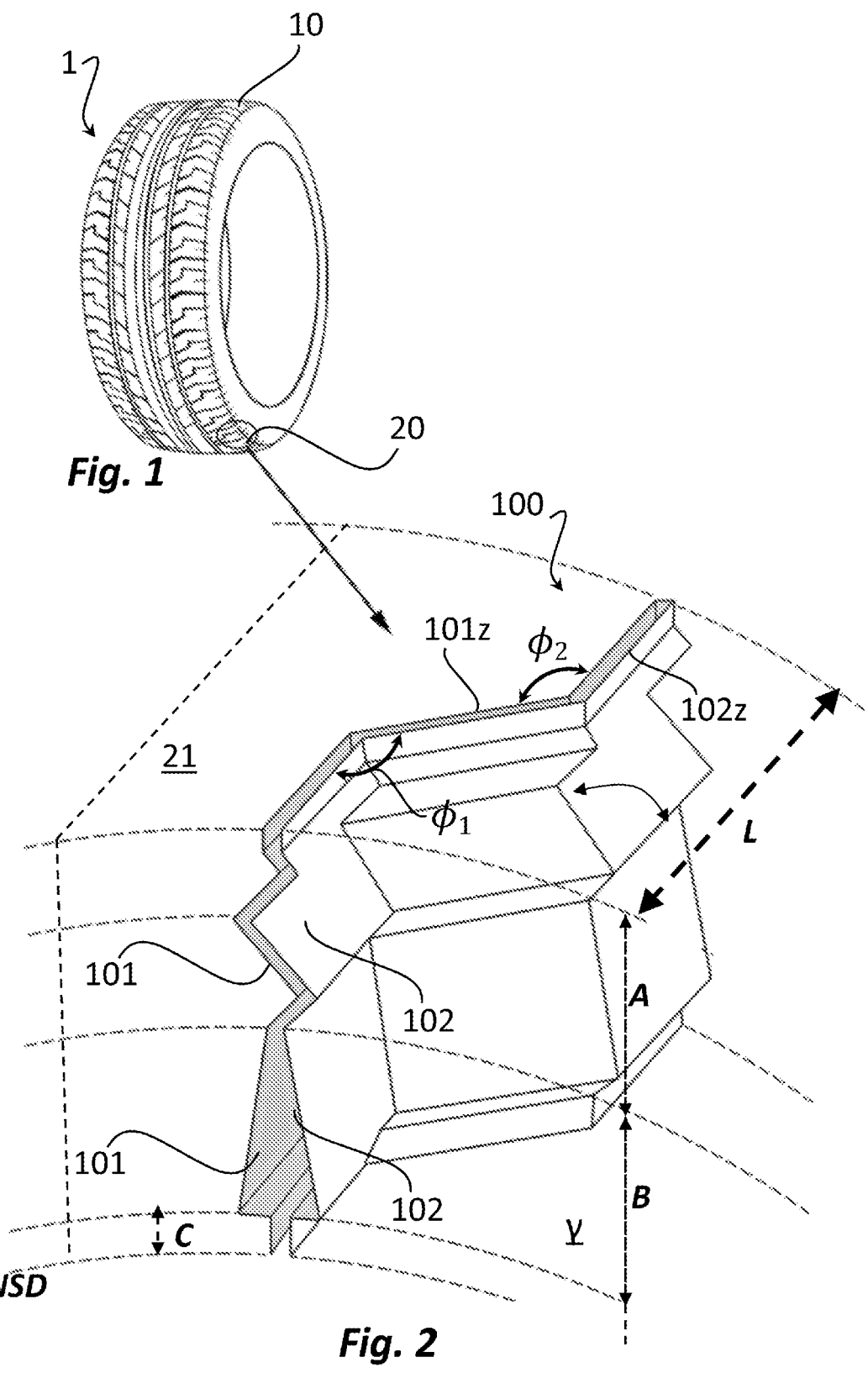
FIG. 1 shows a tire according to the present invention provided with a tread according to the present invention.
FIG. 2 is an exemplary perspective view of a sipe of a tread component according to the present invention.

With initial reference to FIG. 1, a schematic perspective view is shown of a tire 1 comprising a tread 10 according to a preferred embodiment of the present invention.

In general terms, a tread 10 for a tire 1 comprises a plurality of tread components 20. In particular, FIG. 2 shows an exemplary perspective view of a sipe 100 located within a block 20 of the tread 10 according to the present invention. For visual clarity, the solid portions of the block 20 are not shown.

Each block 20 of the tread 10 has a respective contact surface 21 which, together with the tread, defines the surface of the tread itself that is in contact with the ground.

Figure 3:
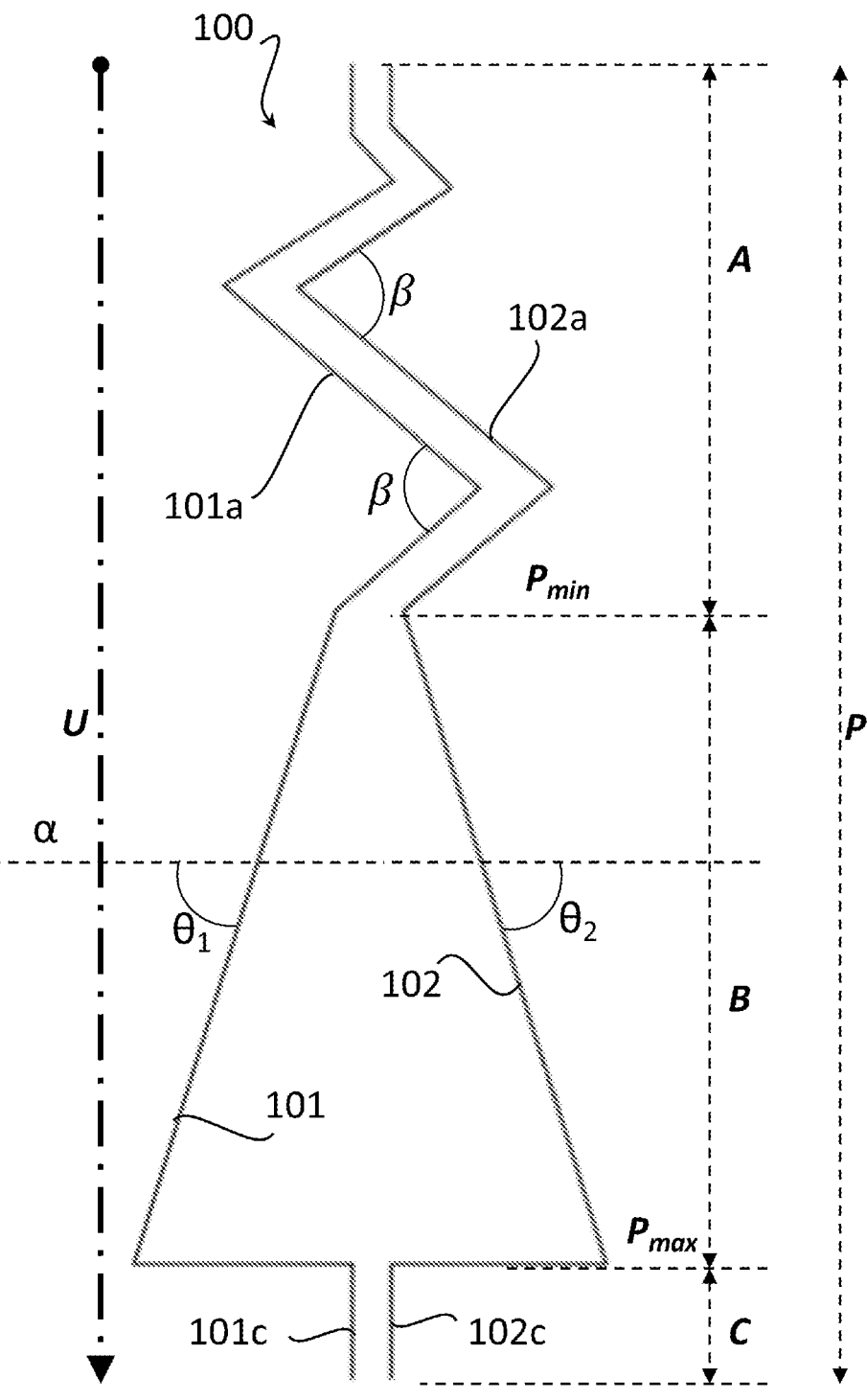
FIG. 3 is a cross-sectional view of the sipe profile of FIG. 2.

According to the present invention and with further reference to FIG. 3, at least one of the blocks 20 of the tread 10 comprises a sipe 100 having a sipe extension L and a sipe depth P, the latter along a direction of wear U that is substantially orthogonal to said contact surface 21. Said direction of wear U is namely a radial direction toward the center of the tire 1.

In a preferred and non-limiting embodiment, the sipe 100 provides for a longitudinal sipe extension L between opposite ends of said block 20.

It is to be understood that said longitudinal extension L of the sipe 100 does not necessarily coincide with the direction of development of the tread 10, but can be oriented differently, depending upon the relative positioning of the block 20 (or other component) within the same tread 10.

As can be seen in FIG. 2, the sipe 100 defines a first face 101 and a second face 102, opposite therebetween, of the component 20 and the sipe depth P, along said direction of wear U, and comprises a first and a second section, respectively denoted with the references A and C.

Preferably, the first section A is located above, namely externally in the radial direction of the tire, with respect to the second section C, the first section A being the section closest to the contact surface 21 under new or progressive wear conditions of the tire 1.

For convenience, reference will therefore be made to said first section A as the upper section and to said second section C as the lower section.

Although not illustrated in the Figures, the sipe 100 within the depth P thereof, may comprise, in preferred embodiments, additional sections located above said first section A along the direction of wear U.

Preferably, the lower section C of the sipe depth P ends at the maximum wear limit of the tread 10 of the tire 1 (non-skid depth, NSD).

Along said direction of wear U, the sipe 100 comprises a further section, or intermediate section B, which connects the first and second sections A, C therebetween.

According to the depth P thereof, the sipe 100 comprises, in sequence from a radially outer position to a radially inner position, said first section A, said intermediate section B and said second section C.

As can be seen in FIG. 3, the first and second opposing faces 101, 102 defined by the sipe 100 have corresponding complementary profiles (101a, 102a) and (101c, 102c), respectively, along the upper A and lower C sections. The first 101 and second 102 faces are spaced apart along said direction of wear U at the intermediate section B.

In this way it is possible to increase the void percentage of the tread 10 and to confer better performance to the tire 1 on wet and/or snow-covered road surfaces.

Advantageously, the tread 10 of the invention therefore has at least one component 20 that is characterized by a specific sipe geometry 100, which determines three regions, or levels, that are located at selected and progressive depths along the direction of wear U.

These regions can cover different percentages of the depth P of the sipe 100, such that the technical effect conferred by the geometry of each section A, B, C of the sipe 100 is synergistic and balanced in relation to the additional sections thereof in order to adjust the stiffness and/or durability of the components 20 of the tread 10, thereby optimizing the performance of the tire 1 as a function of the type of application required.

Preferably, the first section A has an extension of between 40% and 60% of the sipe depth P, the intermediate section B has an extension of between 40% and 60% of the sipe depth P and the second section C has an extension of up to 25% of the sipe depth P.

As can be seen in FIG. 3, the first and second faces 101, 102 are spaced apart at a continuous and increasing distance between a minimum depth $P_{min}$ and a maximum depth $P_{max}$ of the intermediate section B.

Advantageously, the particular geometry of the intermediate section B makes it possible to compensate for the reduction in void percentage of the tread 10 as wear progresses, decreasing the contact area with the road surface, increasing the void percentage and thus retarding the inevitable reduction in the performance of the tire 1.

In other words, the wear of the tire 1 typically involves a decrease in the void percentage offered by the sipe 100, which gradually consumes the depth P thereof along the direction of wear U. According to the invention, this reduction is mitigated by the reciprocal spacing apart of the opposing faces 101, 102 at the intermediate section B. Within this section B of the sipe depth P, the opposing faces 101, 102 preferably have a planar conformation.

This "enlargement" of the intermediate section B, and therefore the void percentage offered by the sipe 100 within the block 20, further compensates for an increase in contact area (and therefore for the overall stiffness of the component) caused by the wear of the latter and due to the typically flared shape of the tread components.

Furthermore, this particular geometry of the intermediate section B, shaped in such a way that there is progressive and continuous spacing between the opposing faces 101, 102, confers a profile to the sipe 100 such as to facilitate the extraction of the mold from the tire during a production step of the latter.

As can be seen in the illustrated example, the first section A and the intermediate section B are preferably seamlessly connected. In other words, the first and the second faces 101, 102 have the same distance at the minimum depth $P_{min}$ where the first section A and the second section B are connected therebetween. Advantageously, any undesired side effects are reduced due to possible discontinuities in the sipe geometry at the transition between one section and the next.

Preferably, the ratio between the reciprocal distance of said first and second faces 101, 102 at said minimum depth $P_{min}$ and at said maximum depth $P_{max}$ is between 0.3 and 0.9. An increase in said ratio favors mold extraction operations, and an improvement is ensured in any case in the adhesion of the intermediate section B on snow-covered/wet surfaces during the rolling of the tire.

According to one embodiment of the invention, the two opposing faces 101 and 102 respectively define a not necessarily equivalent angle $\theta_1$ and $\theta_2$ at said intermediate section B of between 60° and 90° with a surface a that is parallel to said contact surface 21.

Considering now the upper section A, the first and second opposing faces 101, 102 identify respective first profiles 101a, 102a in a plane y that is orthogonal to the direction of longitudinal extension, or sipe extension L.

Said respective first profiles 101a, 102a have a pattern such as to intersect, in said orthogonal plane y, with a straight line at at least two distinct points along said first section A.

As can be seen in the illustrated example, the pattern of the first profiles 101a, 102a is preferably a "zig-zag" pattern, wherein crests (or corresponding valleys) may have different extents. Crests (or valleys) are defined by consecutive sections of said first profiles 101a, 102a wherein each crest (or valley) is preferably defined by two consecutive sections that form therebetween an internal angle β of between 70° and 135°.

A first section A of the sipe 100 such thus it confers elevated rigidity to the component 20, thereby optimizing the performance of the tire 1 on a dry road surface, especially when new.

Preferably, the first and second opposing faces 101, 102 identify additional respective profiles with the aforementioned surface a, which is parallel to the contact surface 21.

For example, with reference to the first section A of the sipe 100, the first and second opposing faces 101, 102 identify profiles that extend along the direction of longitudinal extension L of the sipe 100 and have a pattern such as to be able to intersect, at at least two distinct points, a straight line lying on said surface a. These profiles are denoted in FIG. 1 with the references 101z, 102z.

In this way a sipe geometry 100 is obtained with a three-dimensional pattern wherein the elevated stiffness of the component 20 can be maintained by virtue of the interpenetration—during stressing—of the profiles of said first and second opposing faces 101, 102. That is to say that the opening of the block 20 is rendered difficult when the component is new and subjected to shear stress, for example during braking, as compared to a planar geometry.

Along said direction of longitudinal extension L, the aforesaid profiles 101z, 102z may have a zig-zag pattern, similar to that described previously for the first profiles 101a, 102a. Also in the case, as can be seen in the illustrated example, crests (or valleys) are defined by consecutive sections of said profiles 101z, 102z wherein each crest (or valley) is preferably defined by two consecutive sections that form therebetween an internal angle φ of between 135° and 180°.

Both the first profiles 101a, 102a and the further profiles 101z, 102z along the direction of longitudinal extension L, may comprise more than two consecutive sections such that they form two or more internal angles, respectively β and φ. In embodiments, the profiles 101z, 102z can determine at least a first internal angle $\phi_1$ of a different extent in relation to a second inner angle $\phi_2$.

In a similar way to that previously described for the upper section A, the lower section C of the sipe depth P comprises second profiles 101c, 102c. Said second profiles are obtained within the aforementioned orthogonal plane y in relation to the sipe extension L. Preferably, said second profiles 101c, 102c have a substantially rectilinear pattern.

According to a preferred embodiment, the lower section C also extends along the sipe extension L, according to that described above for the upper section A.

In relation to a first aspect, a lower section C of the sipe depth P, as described above, maintains the rigidity of the tread 10 of the invention low when worn, thereby conferring good grip to the tire 1 on a wet and/or snow-covered road surface, also when the tire is close to the end of the life thereof.

By means of the provision of a lower section C within the tread 10, it is additionally possible according to the invention to obtain different values for the overall rigidity of the block 20, also when the upper section A of the sipe 100 is completely worn. This adjustment is obtainable by modulating the relative extension percentage of the intermediate section B and lower section C, in relation to the sipe depth P.

In terms of the production process, advantageously, the lower section C is sufficiently extended in order to facilitate the separation of the opposing faces 101, 102 of the sipe 100 during the process of extracting the mold from the tread 10, without penalizing the rigidity of the tire 1 when new.

The present invention has heretofore been described with reference to the preferred embodiments thereof. It is intended that each of the technical solutions implemented in the preferred exemplary embodiments described herein can advantageously be combined in different ways therebetween, in order to give form to other embodiments, which belong to the same inventive nucleus and that all fall within the scope of protection afforded by the claims recited hereinafter.

The invention claimed is:

1. A tread for a tire, the tread comprising:
   a plurality of tread components each having a respective contact surface, wherein at least one of the plurality of tread components comprises a sipe defining a first and a second opposing faces of the at least one component;
   wherein the sipe has a sipe depth along a wear direction substantially orthogonal to the respective contact surface;
   wherein the sipe depth comprises in sequence, from a radially external position to a radially internal position, a first and a second section, wherein an intermediate section links said first and second section; and
   wherein the first and second opposing faces:

define first profiles along the first section with a plane orthogonal to a longitudinal extension direction of the sipe, the first profiles presenting a pattern to intersect a straight line lying in the orthogonal plane in at least two distinct points;

define second profiles along the second section with the orthogonal plane, said second profiles presenting a rectilinear pattern; and are continuously and increasingly spaced apart between a minimum depth and a maximum depth of the intermediate section, wherein the width of the sipe in the second section is substantially constant along the depth of the second section and less than the width of the sipe at the maximum depth of the intermediate section.

2. The tread of claim 1, wherein a ratio between a mutual distance of the first and second faces at the minimum depth and at the maximum depth is between 0.3 and 0.9.

3. The tread of claim 1, wherein the first and second opposing faces each defines a respective angle comprised between 60° and 90° with respect to a surface parallel to the contact surface at the intermediate section.

4. The tread of claim 1, wherein the first section has an extension comprised between 40% and 60% of the sipe depth.

5. The tread of claim 1, wherein the intermediate section has an extension comprised between 40% and 60% of the sipe depth.

6. The tread of claim 1, wherein the second section has an extension up to 25% of the sipe depth.

7. The tread of claim 1, wherein the first and second opposing sides have a planar conformation at the intermediate section.

8. The tread of claim 1, wherein the first and second opposing faces define respective third profiles with a surface parallel to the contact surface, the respective third profiles having a pattern to intersect a straight line lying in the parallel surface in at least two distinct points.

9. The tread of claim 1, wherein the sipe has a longitudinal extension comprised between opposite ends of the at least one component.

10. A tire comprising a tread, wherein the tread comprises:

a plurality of tread components each having a respective contact surface, wherein at least one of the plurality of tread components comprises a sipe defining a first and a second opposing faces of the at least one component;

wherein the sipe has a sipe depth along a wear direction substantially orthogonal to the respective contact surface;

wherein the sipe depth comprises in sequence, from a radially external position to a radially internal position, a first and a second section, wherein an intermediate section links said first and second section; and wherein the first and second opposing faces:

define first profiles along the first section with a plane orthogonal to a longitudinal extension direction of the sipe, the first profiles presenting a pattern to intersect a straight line lying in the orthogonal plane in at least two distinct points;

define second profiles along the second section with the orthogonal plane, said second profiles presenting a rectilinear pattern; and are continuously and increasingly spaced apart between a minimum depth and a maximum depth of the intermediate section, wherein the width of the sipe in the second section is substantially constant along the depth of the second section and less than the width of the sipe at the maximum depth of the intermediate section.

11. The tire of claim 10, wherein a ratio between a mutual distance of the first and second faces at the minimum depth and at the maximum depth is between 0.3 and 0.9.

12. The tire of claim 10, wherein the first and second opposing faces each defines a respective angle comprised between 60° and 90° with respect to a surface parallel to the contact surface at the intermediate section.

13. The tire of claim 10, wherein the first section has an extension comprised between 40% and 60% of the sipe depth.

14. The tire of claim 10, wherein the intermediate section has an extension comprised between 40% and 60% of the sipe depth.

15. The tire of claim 10, wherein the second section has an extension up to 25% of the sipe depth.

16. The tire of claim 10, wherein the first and second opposing sides have a planar conformation at the intermediate section.

17. The tire of claim 10, wherein the first and second opposing faces define respective third profiles with a surface parallel to the contact surface, the respective third profiles having a pattern to intersect a straight line lying in the parallel surface in at least two distinct points.

18. The tire of claim 10, wherein the sipe has a longitudinal extension comprised between opposite ends of the at least one component.

\* \* \* \* \*